(12) United States Patent
Leipziger

(10) Patent No.: US 6,440,302 B1
(45) Date of Patent: Aug. 27, 2002

(54) PORTABLE WATER PURIFIER

(76) Inventor: Herb Leipziger, 215 Birchwood Rd., Coram, NY (US) 11727

(*) Notice: Subject to any disclaimer, the term of this patent is extended or adjusted under 35 U.S.C. 154(b) by 71 days.

(21) Appl. No.: 09/712,656

(22) Filed: Nov. 14, 2000

(51) Int. Cl.[7] .................................... B01P 35/06
(52) U.S. Cl. ..................... 210/223; 210/222; 210/695; 210/470; 210/473; 210/483
(58) Field of Search ............................ 210/222, 223, 210/695, 470, 473, 483

(56) References Cited

U.S. PATENT DOCUMENTS

| | | | | |
|---|---|---|---|---|
| 5,556,654 A | * | 9/1996 | Fregeau | 210/222 |
| 5,628,900 A | * | 5/1997 | Naito | 210/223 |
| 5,804,068 A | * | 9/1998 | Reed | 210/222 |
| 5,830,360 A | * | 11/1998 | Mozayeni | 210/266 |
| 5,891,332 A | * | 4/1999 | Okamoto | 210/222 |
| 6,171,490 B1 | * | 1/2001 | Kim | 210/223 |

* cited by examiner

*Primary Examiner*—David A. Reifsnyder

(57) ABSTRACT

An improved portable water purifier of a type having a pitcher with a lower terminal wall and being divided vertically by a lateral partition into an upper compartment for holding raw water and a lower compartment for holding purified water, and a filter depending from the lateral partition into the lower compartment for purifying the raw water into the purified water. The improvement includes a base having a weight and replaceably supporting the pitcher thereon and acting as a coaster therefore, and a permanent magnet having a weight and encased throughout the base for delivering a concentrated and polarized magnetic charge through the lower terminal wall of the pitcher and into the purified water so as to polarize the purified water until its molecules are gradually rearranged from a normal agglomerated state into a more linear, organized, and substantially more permeable state that increases a body's ability to absorb and assimilate the purified water.

5 Claims, 1 Drawing Sheet

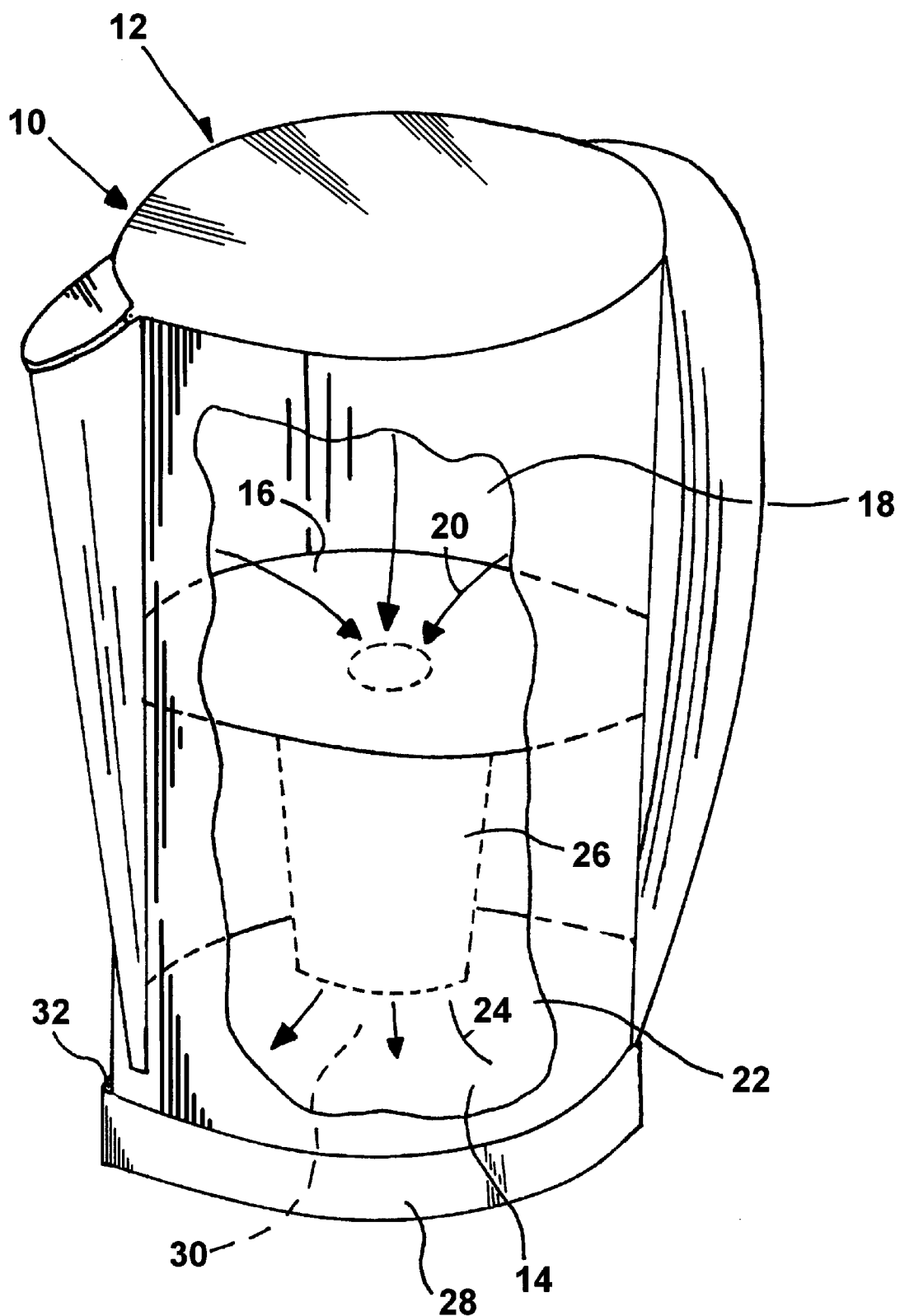

PORTABLE WATER PURIFIER

BACKGROUND OF THE INVENTION

1. Field of the Invention

The present invention relates to a water purifier. More particularly, the present invention relates to an improved portable water purifier.

2. Description of the Prior Art

Drinking water is often not as pure as people would like it to be. Some people ignore the problem and drink water directly from taps. In countries where the water from the taps is not sufficiently pure, the people may suffer stomach upsets. Other people refuse to drink water from taps and they drink only bottled water. The bottled water is expensive to purchase and heavy to carry, especially when large quantities of it are required.

Known in the art of devices for purifying tap water are devices which utilize active carbon etc. to remove residual chlorine and other impurities in tap water, devices which have an additional function of adjusting the water quality, such as pH by an electrolytic treatment or by using an ion exchange resin, and also recently developed devices which utilize an infrared ray irradiation or a magnetization treatment to activate water molecules.

Numerous innovations for liquid purifiers have been provided in the prior art that will be described. Even though these innovations may be suitable for the specific individual purposes to which they address, however, they differ from the present invention.

FOR EXAMPLE, U.S. Pat. No. 5,900,143 to Dalton et al. teaches a portable container for purifying drinking water, which container comprises a body portion for containing the drinking water, a handle for lifting the container for water pouring and water refilling purposes, an ozone generator for generating ozone from air, an air pump for delivering air to the ozone generator in order to produce a mixture of air and ozone and for delivering the mixture of air and ozone to the drinking water in the body portion, and a filter for the drinking water, and the container being such that the mixture of air and ozone delivered to the drinking water in the body portion causes the drinking water and the mixture of air and ozone continuously to pass through the filter whereby the filter filters the drinking water, and the ozone purifies both the water and the filter means.

ANOTHER EXAMPLE, U.S. Pat. No. 5,891,332 to Okamoto teaches a method for purifying raw water taken from a raw water reservoir. The method includes the steps of subjecting the raw water to magnetic treatment, causing the magnetically treated water to flow through a filter medium in a first direction for purification of the treated water, and discharging the purified water into the raw water reservoir. The method further includes the steps of causing the magnetically treated water to pass through the filter medium in a second direction opposite to the first direction, and discharging the oppositely passing water into the raw water reservoir. The apparatus for realizing the above method includes a water intake assembly, a filter assembly, and a water discharge assembly. A magnetic treatment device is mounted on the water intake assembly for subjecting the raw water to magnetic treatment. A switching device is operated to cause the magnetically treated water to flow through the filter assembly selectively in the first and second directions.

STILL ANOTHER EXAMPLE, U.S. Pat. No. 5,804,068 to Reed teaches a fluid treatment device having a fluid containment housing with a first containment region and a second containment region. The first and second containment regions are connected in fluid flow communication with one another by a generally narrow, elongate transfer channel that permits fluid to flow therethrough from one containment region to another while the fluid defines a natural vortex. Moreover, a generally powerful, polarized magnet is disposed about the transfer channel in order to deliver a concentrated, polarized magnetic charge into the transfer channel, thereby acting on the fluid flowing in the natural vortex through the transfer channel and polarizing it until the fluid molecules thereof are gradually rearranged from a normal agglomerated state into a more linear, organized and substantially more permeable state that will increase a body's ability to absorb and assimilate the fluid and obtain benefits therefrom.

YET ANOTHER EXAMPLE, U.S. Pat. No. 5,628,900 to Naito teaches a water purifier that includes a filter having a cylindrical housing formed with a water inlet at one end and a water outlet at the other end and contains in the housing a ceramic layer consisting of granular ceramic heaped up in a layer, a magnetite layer consisting of broken pieces of magnetite heaped up in a layer and provided at least above or below the ceramic layer, and annular magnets provided above and below the ceramic layer in such a manner that these annular magnets coincide with each other in the sense of magnetic lines of force and that the direction of the magnetic lines of force is parallel to the direction of flow of water. Water molecules are activated while passing through the magnetic field produced by the annular magnets and the magnetite layers which are magnetized by the annular magnets.

STILL YET ANOTHER EXAMPLE, U.S. Pat. No. 5,556,654 to Fregeau teaches a method of treating consumable liquids, the liquids so produced, and an assembly for practicing the method. Consumable liquid is passed through a magnetic field having properties effective to enhance the flavor of the liquid, the field preferably being established by a permanent magnet establishing a continuous polarity on opposite sides of the liquid with a minimum magnetic field strength of about 3000 Gauss. The assembly for treating the liquids may include first and second tubular permanent magnets having opposite radially spaced first and second pole portions of opposite polarity, a pair of pole pieces received between the pole portions, and in encasement for maintaining the magnets and pole pieces together so that a fluid flow path is defined through the magnets and a predetermined gap established by the pole pieces, and so that the pole portions of the same polarity for each magnet are on the same side of the flow path.

It is apparent that numerous innovations for liquid purifiers have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide an improved portable water purifier that avoids the disadvantages of the prior art.

ANOTHER OBJECT of the present invention is to provide an improved portable water purifier that is simple and inexpensive to manufacture.

STILL ANOTHER OBJECT of the present invention is to provide an improved portable water purifier that is simple to use.

BRIEFLY STATED, YET ANOTHER OBJECT of the present invention is to provide an improved portable water purifier of a type having a pitcher with a lower terminal wall and being divided vertically by a lateral partition into an upper compartment for holding raw water and a lower compartment for holding purified water, and a filter depending from the lateral partition into the lower compartment for purifying the raw water into the purified water. The improvement includes a base having a weight and replaceably supporting the pitcher thereon and acting as a coaster therefore, and a permanent magnet having a weight and encased throughout the base for delivering a concentrated and polarized magnetic charge through the lower terminal wall of the pitcher and into the purified water so to polarize the purified water until its molecules are gradually rearranged from a normal agglomerated state into a more linear, organized, and substantially more permeable state that increases a body's ability to absorb and assimilate the purified water and obtain benefits therefrom, with the base providing triple duty as a support and coaster for the pitcher and as an enclosure for the permanent magnet and being separate from the pitcher when the pitcher is lifted so as not to have to contend with the weight of the base and the permanent magnet encased therein when pouring.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The sole figure of the drawing is a perspective view of the present invention partially broken away.

LIST OF REFERENCE NUMERALS UTILIZED IN THE DRAWING

Prior Art 10 typical portable water purifier 10
12 pitcher
14 lower terminal wall of pitcher 12
16 lateral partition 16 in pitcher 12
18 upper compartment in pitcher 12 for holding raw water 20
20 raw water
22 lower compartment in pitcher 12 for holding purified water 24
24 purified water
26 filter for purifying raw water 20 into purified water 24

Present Invention 28 base
30 permanent magnet for delivering concentrated and polarized magnetic charge into purified water 24 so as to polarize purified water 24 until molecules are gradually rearranged from normal agglomerated state into more linear, organized, and substantially more permeable state that increases body's ability to absorb and assimilate purified water 24 and obtain benefits therefrom, with base 28 providing triple duty as a support and coaster for pitcher 12 and as enclosure for permanent magnet 30
32 lip extending circumferentially completely around periphery of base 28

DESCRIPTION OF THE PREFERRED EMBODIMENT

Referring now to the sole figure, which is a perspective view of the present invention partially broken away, a typical portable water purifier is shown generally at 10 of a type having a pitcher 12 with a lower terminal wall 14 and being divided vertically by a lateral partition 16 into an upper compartment 18 for holding raw water 20 and a lower compartment 22 for holding purified water 24, and a filter 26 depending from the lateral partition 16 into the lower compartment 20 for purifying the raw water 20 into the purified water 24.

The improvement comprises a base 28 having a weight and replaceably supporting the pitcher 12 thereon and acting as a coaster therefore, and a permanent magnet 30 having a weight and encased throughout the base 28 for delivering a concentrated and polarized magnetic charge through the lower terminal wall 14 of the pitcher 12 and into the purified water 24 so as to polarize the purified water 24 until its molecules are gradually rearranged from a normal agglomerated state into a more linear, organized, and substantially more permeable state that increases a body's ability to absorb and assimilate the purified water 24 and obtain benefits therefrom, with the base 28 providing triple duty as a support and for the pitcher 12 and as an enclosure for the permanent magnet 30 and being separate from the pitcher 12 when the pitcher 12 is lifted so as not to have to contend with the weight of the base 28 and the permanent magnet 30 encased therein when pouring.

The improvement further comprises the base 28 having a shape matching that of the lower terminal wall 14 of the pitcher 12.

The improvement further comprises the base 28 having a periphery with an upwardly extending lip 32 extending it circumferentially completely there around and cradling the lower terminal wall 14 of the pitcher 12 so as to prevent the pitcher 12 from moving laterally relative to the base 28.

The improvement further comprises the base 28 being plastic so as to be impervious to water moisture.

The improvement further comprises the permanent magnet 30 filling the base 28 completely so as to be in communication with all of the lower terminal wall 14 of the pitcher 12 so as to expose all of the purified water 24 to its polarized magnetic charge.

It will be understood that each of the elements described above, or two or more together, may also find a useful application in other types of constructions differing from the types described above.

While the invention has been illustrated and described as embodied in an improved portable water purifier, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. An improved portable water purifier of a type having a pitcher with a lower terminal wall and being divided vertically by a lateral partition into an upper compartment for holding raw water and a lower compartment for holding purified water, and a filter depending from the lateral partition into the lower compartment for purifying the raw water into the purified water, said improvement comprising:
   a) a base having a weight and replaceably supporting the pitcher thereon and acting as a coaster therefore; and
   b) a permanent magnet having a weight and encased throughout the base for delivering a concentrated and polarized magnetic charge through the lower terminal wall of the pitcher and into the purified water so as to polarize the purified water until its molecules are gradually rearranged from a normal agglomerated state into a more linear, organized, and substantially more permeable state that increases a body's ability to absorb and assimilate the purified water and obtain benefits therefrom, with the base providing triple duty as a support and coaster for the pitcher and as an enclosure for the permanent magnet and being separate from the pitcher when the pitcher is lifted so as not to have to contend with the weight of the base and the permanent magnet encased therein when pouring.

2. The improved purifier as defined in claim 1, wherein said improvement further comprises said base having a shape matching that of the lower terminal wall of the pitcher.

3. The improved purifier as defined in claim 1, wherein said improvement further comprises said base having a periphery with an upwardly extending lip extending circumferentially completely there around and cradling the lower terminal wall of the pitcher so as to prevent the pitcher from moving laterally relative to said base.

4. The improved purifier as defined in claim 1, wherein said improvement further comprises said base being plastic so as to be impervious to water moisture.

5. The improved purifier as defined in claim 1, wherein said improvement further comprises said permanent magnet filling said base completely so as to be in communication with all of the lower terminal wall of the pitcher so as to expose all of the purified water to its polarized magnetic charge.

* * * * *